(12) United States Patent
Liang et al.

(10) Patent No.: US 12,514,873 B2
(45) Date of Patent: Jan. 6, 2026

(54) STABLE PHARMACEUTICAL ARTICLES CONTAINING DILUTE POVIDONE IODINE FORMULATIONS

(71) Applicant: IVIEW Therapeutics, Inc., Doylestown, PA (US)

(72) Inventors: Bo Liang, Plainsboro, NJ (US); Ming Zhang, Doylestown, PA (US)

(73) Assignee: IVIEW Therapeutics, Inc., Cranbury, NJ (US)

(*) Notice: Subject to any disclaimer, the term of this patent is extended or adjusted under 35 U.S.C. 154(b) by 0 days.

(21) Appl. No.: 16/962,212

(22) PCT Filed: Jul. 8, 2020

(86) PCT No.: PCT/US2020/041089
§ 371 (c)(1),
(2) Date: Jul. 14, 2020

(87) PCT Pub. No.: WO2021/034421
PCT Pub. Date: Feb. 25, 2021

(65) Prior Publication Data
US 2021/0401878 A1    Dec. 30, 2021

Related U.S. Application Data

(60) Provisional application No. 62/888,523, filed on Aug. 18, 2019.

(51) Int. Cl.
*A61K 33/18* (2006.01)
*A61K 47/32* (2006.01)

(52) U.S. Cl.
CPC .............. *A61K 33/18* (2013.01); *A61K 47/32* (2013.01)

(58) Field of Classification Search
CPC ...................................................... A61K 33/18
See application file for complete search history.

(56) References Cited

U.S. PATENT DOCUMENTS

| 4,996,048 | A | * | 2/1991 | Bhagwat | ............... A01N 59/12 424/405 |
| 5,126,127 | A | * | 6/1992 | Bhagwat | .............. A61K 9/0048 424/78.25 |
| 5,178,853 | A | * | 1/1993 | Jauw | ..................... A61K 9/0048 424/667 |
| 2012/0282323 | A1 | * | 11/2012 | Muhlau | ................... A61P 17/02 424/78.25 |
| 2014/0322345 | A1 | * | 10/2014 | Liang | ..................... A61P 31/04 424/499 |
| 2018/0207122 | A1 | | 7/2018 | Scholz et al. | |
| 2020/0000714 | A1 | * | 1/2020 | Aleo | ....................... A61K 31/79 |

FOREIGN PATENT DOCUMENTS

| WO | WO-2017074965 A1 * | 5/2017 | ........... A61K 31/155 |
| WO | WO-2020023666 A1 * | 1/2020 | ............. A61K 33/18 |

* cited by examiner

*Primary Examiner* — Robert A Wax
*Assistant Examiner* — William Craigo
(74) *Attorney, Agent, or Firm* — Weisun Rao; Jun Chen; Venture Partner, LLC

(57) ABSTRACT

The present invention provides a pharmaceutical article that includes a container and a dilute aqueous PVP-I formulation contained in the container, wherein the container is made of polyethylene terephthalate (PET) or polypropylene (PP). The pharmaceutical article provides the aqueous PVP-I formulation with surprisingly enhanced stability over PVP-I-formulations in other pharmaceutical package forms, without the need of a stabilizing agent in the PVP-I formulations.

10 Claims, 11 Drawing Sheets

STABLE PHARMACEUTICAL ARTICLES CONTAINING DILUTE POVIDONE IODINE FORMULATIONS

CROSS-REFERENCE TO RELATED APPLICATIONS

This application is the US national phase of International Application No. PCT/US2020/041089 filed on Jul. 8, 2020, which claims priority to U.S. Application No. 62/888,523, filed on Aug. 18, 2019, the contents of both of which are incorporated herein by reference in their entirety.

BACKGROUND OF THE INVENTION

Povidone iodine (PVP-I), also called iodophor, is a complex of polyvinylpyrrolidone and iodine, containing 9-12% effective iodine. It is a powerful disinfectant with broad-spectrum applications and is effective against viruses, bacteria, fungi, and mold spores. PVP-I products have been used as disinfectants for the inactivation of various bacteria and viruses for years because of their strong bactericidal and antiviral activities. PVP-I is routinely used in ophthalmology and general surgery, as well as in acute and chronic treatment of a variety of other diseases. There have been numerous clinical studies demonstrating the safety of PVP-I in a variety of topical applications in ophthalmology, otology, rhinology and dermatology (see, e.g., U.S. Pat. No. 5,126,127; US 2014/0219949; Jaya et al., *Arch Otolaryngol Head Neck Surg.* 2003, 129:10:1098-240; Rooijackers-Lemmens et al., *Huisarts Wet.* 1995, 28:6:265-71; Rowlands et al., *Br J Gen Pract.* 2001, 51:468:533-38; Kavanagh et al., *World Articles in Ear Nose & Throat,* 27 May 2008; and US 2017/0266294). It causes little irritation on skin and has low toxicity and lasting effect, and can be used safely and easily. The anti-virus activity is mainly due to the free iodine released from PVP-I (see, e.g., Wada et al., *Biocontrol Sci.* 2016, 21:1:21-7). The principle of sterilization by PVP-I is mainly through the release of hydrated iodine which has bactericidal effect. Povidone is hydrophilic and can carry iodine to cell membrane. When the PVP-I complex arrives at the cell wall, iodine is released and forms complexes with amino acids of bacterial protein to denature and oxidize the active groups of the bacteria's protoplasmic protein at the same time so that the bacteria would die rapidly. PVP-I is a very good bactericidal agent with no antibiotic resistance. In common use, PVP-I's concentration is between 0.1% and 10%. Currently commercially available aqueous PVP-I preparations in with plastic packaging are generally in the forms of gel, suppository, cream, and solution, with PVP-I concentration ranging from 1% to 10%.

PVP-I eye drops have been widely used for the treatment of ocular infection, however a concentration of 5% may cause toxicity and irritation that cannot be overlooked. Grimes and others treated infected eyes repeatedly with 0.02% PVP-I eye drops which has the same germicidal effects as 5.0% PVP-I but without the toxicity and irritation. See, e.g., S. R. Grimes et al., Mil. Med., 1992, 157:111-113. In order to retain the PVP-I eye drops' sterilizing effect, while eliminating or reducing its toxicity to eyes, clinicians have used PVP-I eye drops with concentration of 0.04% to disinfect eyes with no noticeable toxicity. It has been well documented in literature that PVP-I at concentrations less than 2% (w/w) is in fact tolerable and non-toxic. See, e.g., NC Santos et al. *Arq. Bras. Oftalmol.*, June 2003, 66: 279-298, and J. Wu Jiang et al., *Cutaneous and Ocular Toxicology,* 2009, 28(3): 119-124. In the placebo-controlled trial of 459 children treated for bacterial, viral, and *Chlamydia* conjunctivitis with 1.25% PVP-I, there was no reported toxicity by slit-lamp examination and no subjects dropped out of the study due to intolerance of the eye drops. See, e.g., S J. Isenberg et al. *Am J Ophthalmol* 2002, 134: 681-68. While tolerability seems to increase as the PVP-I concentration is lowered from 10% to 0.5%, the antimicrobial efficacy increases. This is due to the equilibrium distribution of iodine species in aqueous solutions. See e.g. Gottardi, W. *J. Hosp. Infect.,* 6: (Suppl.) 1985. We have previously reported a low concentration PVP-I in combination with dexamethasone eye drops as potential treatment for acute conjunctivitis. See, e.g., U.S. Pat. No. 7,767,217 B2. Our U.S. Pat. No. 9,308,173B2 provides an slow-releasing ophthalmic formulation containing PVP-I where PVP-I exists as microspheres formed by PVP-I and sodium alginate and cured by calcium chloride. We have also developed a proprietary PVP-I based sustained release product platform (US Patent No. 2017/0266294 and Patent WO 2019/046844) to produce in-situ gel formulations where the effective concentration of PVP-I is maintained by the equilibrium between solution PVP-I and the gel bound components resulting in a long lasting and less toxic pharmacological effect in the eye and the nasal cavity.

However, at a low concentration, PVP-I will degrade quickly and its concentration cannot be effectively maintained during storage. Dilute PVP-I products need to be stored at lower temperature; and maintaining a reasonable shelf-life of dilute PVP-I solutions has been challenging.

Addition of stabilizers such as iodine donating species i.e. iodate salts as disclosed in U.S. Pat. No. 4,113,857 (Shetty), and CN1965857 (Jie Zeng, Hong Zhang); and the use of iodide salts as disclosed in U.S. Pat. No. 4,996,048 (Bhagwat et al.) were used to overcome shelf-life stability problems associated with packaging such dilute PVP-I solutions in soft plastic bottle or containers. U.S. Pat. No. 4,996,048A described introducing additional amount of iodide into the packaging to minimize leaching of the iodine through the packaging while stabilizing the iodophor solution. U.S. Pat. No. 5,178,853 described an ophthalmic preparation of dilute PVP-I solution in a package consisting a bottle of glass or polyethylene terephthalate (PET) with a dropper of polypropylene, polyethylene and/or polytetrafluoroethylene coated bromobutyl rubber. Potassium iodate was added in the formulation as the stabilizer. Three different bottles were tested in the patent: glass bottle, PET bottle and Polyvinyl chloride (PVC) bottle. It was found that the solution in glass bottle was stable at room temperature for 2 years. For the solution in PET bottle, the available iodine was still about 90% after 2 years, however, the stability is worse than in glass bottles, while the solution in PVC bottle had a decrease of the available iodine of 80% after 2 years. Overall, the stability in glass bottles are the best. Thus the glass bottle was the preferred packaging for dilute PVP-I solutions for long term shelf-life storage. During our prior clinical studies for dilute 0.6% PVP-I/0.1% Dexamethasone eye drop, amber glass bottles were used as containers for the dilute PVP-I/dexamethasone suspensions to maintain shelf-life stability of the clinical trial material.

However, there is a potential breakage issue for glass bottles during transportation and patient use and may cause harm to patient eyes. Also, a stabilizer such as potassium iodate or potassium iodine may cause potential toxicity for long time ocular use or other uses (such as intranasal administration) as those stabilized dilute PVP-I solutions were maintained by addition of stabilizers. Therefore, it is our goal to develop dilute PVP-I formulations with compatible packaging in plastic bottles to solve the stability problem of dilute PVP-I solutions without stabilizer in plastic bottles.

SUMMARY OF THE INVENTION

The present invention is based on Applicant's unexpected discovery that containers made of certain plastics [such as polyethylene terephthalate (PET), high density polyethylene (HDPE), polypropylene (PP)] yielded significantly better stability for dilute PVP-I formulations even without any stabilizer than in amber glass bottles.

As used herein, a "dilute" PVP-I solution or formulation contains PVP-I at the concentration not greater than 5%, measured either by weight/weight (w/w) or by weight/volume (w/v).

As used herein, the term "available iodine" or "available iodine content" refers to the free iodine that can be released from PVP-I complex to exert germicidal action.

As used herein, the term "container" refers to any receptacle or enclosure for holding a liquid product used in storage, packaging, and shipping. It can be in the form of a bottle, a can, a jar, a box, a barrel, or a bag.

Accordingly, the present invention provides a pharmaceutical article comprising a container and a dilute aqueous povidone iodine (PVP-I) formulation contained in the container, wherein the container is made of polyethylene terephthalate (PET), high density polyethylene (HDPE), polypropylene (PP), or any combination thereof, the PVP-I formulation contains PVP-I at a concentration not greater than 5%, and at least 90% of original available iodine content in the PVP-I formulation remains in the formulation after one month.

In some embodiments of the invention, the container is made of polyethylene terephthalate (PET).

In some other embodiments, the aqueous PVP-I formulation is in the form of a solution, aqueous solution, emulsion, cream, gel, or any other liquid or semi-solid form (such as suspension or paste).

In some other embodiments, the PVP-I concentration is in the range of 0.1-5.0% (w/w or w/v), 0.1-2.5% (w/w or w/v), 0.1-1.5% (w/w or w/v), or 0.1-1.0% (w/w or w/v), or at the concentration of about 0.3%, 0.36%, 0.48%, 0.6%, or 1.0% (w/w or w/v).

In some other embodiments, the PVP-I formulation has a pH value in the range of pH 3.5 to pH 7.0 (e.g., 3.5, 4.0, 4.6, 5.0, 5.6, 6.0, or 7.0). The PVP-I formulation can be buffered or non-buffered.

In some other embodiments, the container further includes a bottle, a tip, or a dropper, and a cap. The tip or dropper can be made of HDPE, while the cap can be made with polypropylene (PP) or other materials.

The pharmaceutical articles in the present invention unexpectedly provide surprisingly stable or stabilized PVP-I formulations without the need of any stabilizing agent for the formulations in amber glass bottles, and stability of the formulation is such that at least 90% of the original available iodine content in the PVP-I formulation remains in the formulation after one month, in some case at least 80% after three months.

BRIEF DESCRIPTIONS OF THE FIGURES

DETAILED DESCRIPTION OF THE INVENTION

Figure 1:
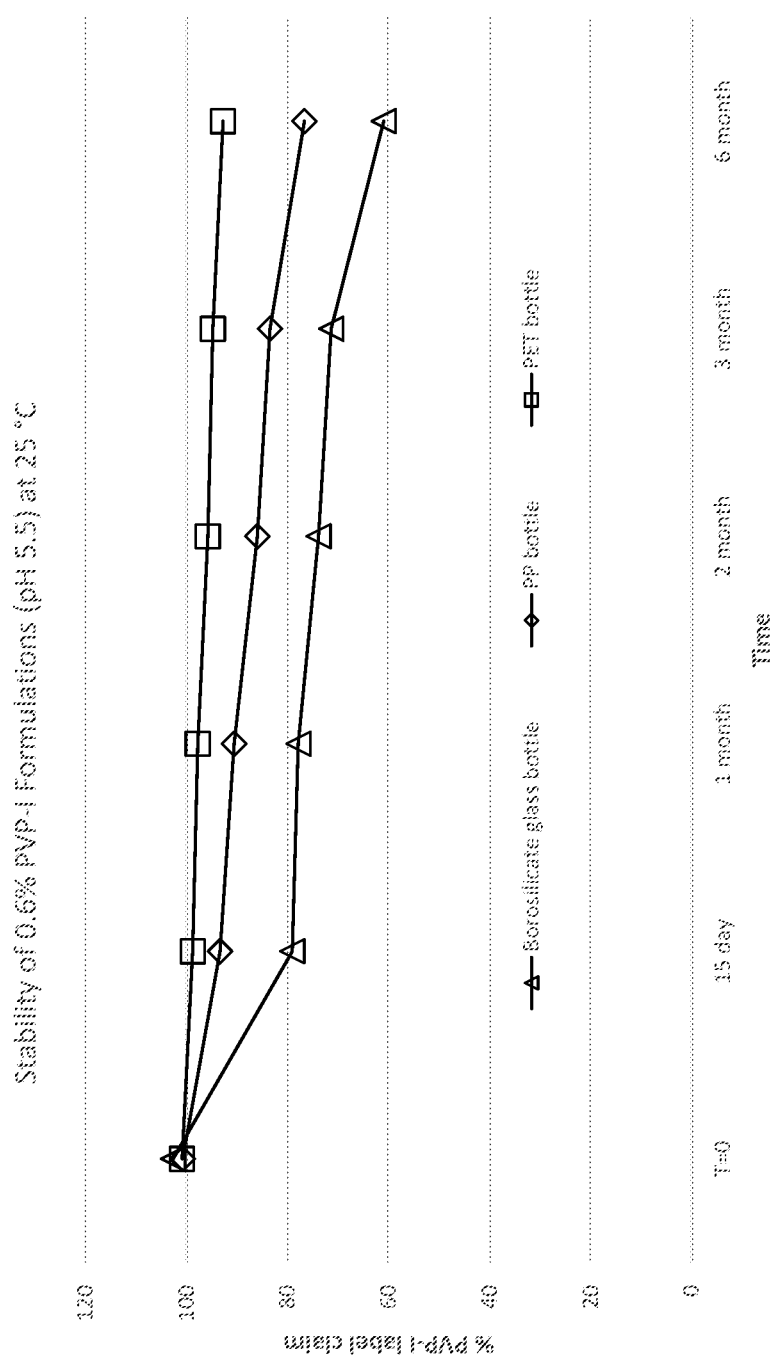
FIG. 1 shows the stability data of 0.6% PVP-I formulation (pH 5.5) at 25° C. in borosilicate glass (amber glass), PP, and PET bottles.

At low concentrations, PVP-I will degrade quickly and low-concentration PVP-I solutions cannot be effectively maintained during storage. Therefore, dilute PVP-I products (with a PVP-I concentration not greater than 5%, w/w or v/w) generally need to be stored at a lower temperature; yet it still remains a challenge to maintain a reasonable shelf-life of dilute PVP-I solutions. Plastic bottles such as high-density polyethylene (HDPE) have been used as the packaging containers for PVP-I solutions with higher PVP-I concentrations, e.g., greater than 5% (weight/volume or weight/weight). For instance, 10% PVP-I antiseptic solutions (Betadine®) are packaged in HDPE plastic bottles, as do the 5% PVP-I ophthalmic solution for pre-op and post-op ophthalmic surgery disinfection. In other words, packaging material does not appear to have an effect on the stability of PVP-I solution with high concentrations (greater than 5%). However, Applicant unexpectedly discovered that the package material is critical for the stability of dilute PVP-I solutions (with PVP-I concentrations less than 5%). Specifically, it was demonstrated that HDPE did not yield better stability as compared to glass bottle in our previous experiments. Similar effort has been done with low density polyethylene (LDPE) bottles; and it was found that PVP-I formulation has lower stability in LDPE bottles than in HDPE bottles. All LDPE samples showed yellowing at the end of 1 week and there was a noticeable smell associated with samples. Therefore, it has demonstrated that dilute PVP-I solutions were unstable in LDPE bottles. In U.S. Pat. No. 5,126,127, Bhagwat describes stabilizing a dilute 0.3-0.6% PVP-I ophthalmic solution by adding a stabilizing agent (i.e., an alkalinizing agent) to the PVP-I solution, rendering the PVP-I solution stable for three years at room temperature in a non-permeable container, preferably glass bottles, and being nonbuffered.

The stable dilute compositions in this invention contain povidone Iodine (PVP-I). The concentration of the PVP-I may range from 0.1% to 5% (weight/weight or weight/volume, w/w or w/v), from 0.3% to 1% (w/w or w/v), or from 0.3% to 0.6% (w/w or w/v). The composition may also contain excipients such as pH adjustment agents, viscosity adjustment agents, and osmotic pressure regulator. The packaging container of this composition is made of polyethylene terephthalate (PET), high-density polyethylene (HDPE), or polypropylene (PP) plastic material, which enhances storage stability of the aqueous composition as compared to glass containers. No stabilizer was not required in the compositions in this patent.

The pH regulator contained in the formulations of this invention can include sodium hydroxide, trishydroxymethylaminomethane (Tromethamine, Tris), or phosphoric acid, resulting in a pH of 3.5 to 7.0 or 4.0 to 6.0.

The viscosity adjustment agents of this invention can be any ingredients used in prior art.

The osmotic pressure regulator contained in the formulations of this invention may include sodium chloride, glycerol, polyethylene glycol 400 (PEG400), mannitol, or borate, with a concentration ranging from 0.1 to 0.9% (w/v) or from 0.2 to 0.4% (w/v).

The stable dilute PVP-I composition can be in the form of aqueous solution, emulsion, suspension, cream, gel, or any other liquid and semi-solid forms.

The invention is further elucidated with specific examples. It is understood that these examples are only used to describe the invention but not to intend to limit the scope of invention. The experimental methods with no specific conditions in the following examples, are usually prepared under conventional conditions in the literature or according to the conditions suggested by the excipient manufacturer. Unless specifically stated, all percentages, ratios, proportions or fractions disclosed in this invention are calculated by weight by weight. Unless specifically defined in this invention, all professional and scientific terms used herein have the same meaning as well-trained personnel may be familiar with. In addition, any methods and materials similar or equivalent to those recorded in this invention can be applied to this invention. The preferred embodiments and materials described herein are used only for exemplary purposes.

No stabilizing agent was added in the preparation of the PVP-I solutions or formulations described in the following examples. Unless otherwise stated, the PVP-I concentrations referred to in the following examples are based on w/w.

Example 1

Dilute aqueous PVP-I solutions of different concentrations and pH values were prepared with a formulation recipe described in U.S. Pat. No. 7,767,217 B2. Briefly, the aqueous solutions contained 0.36-0.60% PVP-I, 0.1% dexamethasone, 0.01% ethylenediaminetetraacetic acid (EDTA), 0.3% sodium chloride, 1.2% sodium sulfate, 0.05% Tyloxapol and 0.25% hydroxyethyl cellulose. The pH values of the solutions were adjusted to 4.0 or 4.5 by sulfuric acid and/or sodium hydroxide. The final dilute aqueous solutions as prepared were packaged in amber glass or HDPE bottles. The stability of these dilute aqueous solutions was evaluated at different temperatures by measuring the amounts of available iodine in these dilute aqueous solutions by titration for 2 weeks. As used herein, the term "available iodine" means the free iodine that can be released from PVP-I complex to exert germicidal action thereof, which can be titrated with a standardized sodium thiosulfate solution as the titrant and starch solution as the indicator.

As an example of the titrant or titration method used herein, about 3-10 gram of a PVP-I solution was weighed into a suitable flask and about 10 g of purified water was added in the flask to result in a diluted solution. Titration was performed as soon as the dilute solution became homogenous using a standard sodium thiosulfate solution (e.g., 0.02 mol/L, 0.004 mol/L, or another suitable concentration). When the color became slightly yellow, about 10 drops of starch indicator was added dropwise to titrate the solution slowly. The end point was achieved once the solution became visually colorless. The available iodine in the sample was calculated as follows:

$$\text{available iodine(mg)} = \text{volume titrant(ml)} \times \text{Titrant Concentration}(N) \times 126.9$$

Table 1 lists the percentage of available iodine based on initial content for different solutions under at different storage conditions.

TABLE 1

PVP-I stability after storage for 2 weeks (available iodine percentage based on initial amounts of available iodine)

| Solutions | Container material | 25° C. | 30° C. | 40° C. |
|---|---|---|---|---|
| 0.6% PVP-I (pH 4.0) | Glass | 99% | 97% | 88% |
|  | HDPE | 92% | 90% | 64% |
| 0.6% PVP-I (pH 4.5) | Glass | 97% | 98% | 88% |
|  | HDPE | 92% | 83% | 65% |
| 0.48% PVP-I (pH 4.0) | Glass | 103% | 100% | 87% |
|  | HDPE | 92% | 88% | 57% |
| 0.48% PVP-I (pH 4.5) | Glass | 94% | 94% | 80% |
|  | HDPE | 87% | 81% | 55% |
| 0.36% PVP-I (pH 4.0) | Glass | 92% | 92% | 79% |
|  | HDPE | 82% | 74% | 40% |
| 0.36% PVP-I (pH 4.5) | Glass | 87% | 91% | 76% |
|  | HDPE | 84% | 75% | not tested |

The data show that the dilute aqueous PVP-I solutions were more stable in amber glass bottles as compared to in HDPE bottles when the pH values of these formulations were either 4 or 4.5. The stability difference between the two types of bottles increased with the decrease in PVP-I concentration. Further, the more dilute the aqueous PVP-I solutions were in both amber glass and HDPE containers, the less stable were the solutions. For 0.6% PVP-I formulation (pH 4.0) at 40° C. after two weeks, the difference in available iodine between in the two different bottles was 24%, while the difference was 30% for 0.48% PVP-I solutions and 39% for 0.36% PVP-I solutions. This trend was not significant for stability at 5° C. as the dilute aqueous PVP-I solutions were more stable at a low temperature. Therefore, the amber glass containers/bottles contributed more stability for these dilute aqueous PVP-I solutions at lower PVP-I concentrations. The dilute PVP-I solutions also showed better stability with a lower pH value.

Example 2

Two dilute aqueous PVP-I eye drop formulations containing 0.6% PVP-I and 1.0% PVP-I were prepared according to the compositions set forth below in Table 2.

TABLE 2

| Ingredient | 0.6% PVP-I Formulation | 1.0% PVP-I Formulation |
|---|---|---|
| PVP-I | 0.63 | 1. |
| Gellan gum | 0.25 | 0.25 |
| Sodium Chloride | 0.25 | 0.25 |
| Mannitol | 3.5 | 3.3 |
| Tromethamine | as needed | as needed |
| Distilled water | Q.S. | Q.S. |
| pH | 5.5 | 5.5 |

The stability of these two dilute low-concentration PVP-I eye drop formulations was investigated after they were filled into amber borosilicate glass bottles, PET bottles, and polypropylene (PP) bottles, respectively. Table 3 and Table 4 below list the results of the stability studies of these dilute aqueous PVP-I solutions after they were stored at different time points at 25° C. The concentration of PVP-I was determined by sodium thiosulfate titration as descripted in Example 1.

TABLE 3

Stability data of 0.6% PVP-I formulations (pH 5.5) at 25° C.

| Container | 0 | 15 days | 1 month | 2 months | 3 months | 6 months |
|---|---|---|---|---|---|---|
| Borosilicate amber glass bottle | 102.7 | 79.1 | 77.9 | 73.9 | 71.4 | 61.0 |
| PET bottle | 100.9 | 98.8 | 97.8 | 95.8 | 94.8 | 92.8 |
| PP bottle | 100.8 | 93.4 | 90.6 | 86.0 | 83.5 | 76.7 |

TABLE 4

Stability data of 1.0% PVP-I formulations (pH 5.5) at 25° C.

| Container | 0 | 15 days | 1 month | 2 months | 3 months | 6 months |
|---|---|---|---|---|---|---|
| Borosilicate amber glass bottle | 101.8 | 90.1 | 92.4 | 90.6 | 88.0 | 86.8 |
| PET bottle | 101.3 | 99.2 | 99.5 | 99.3 | 98.5 | 99.1 |
| PP bottle | 101.1 | 94.7 | 96.0 | 93.7 | 91.6 | 88.2 |

Figure 2:
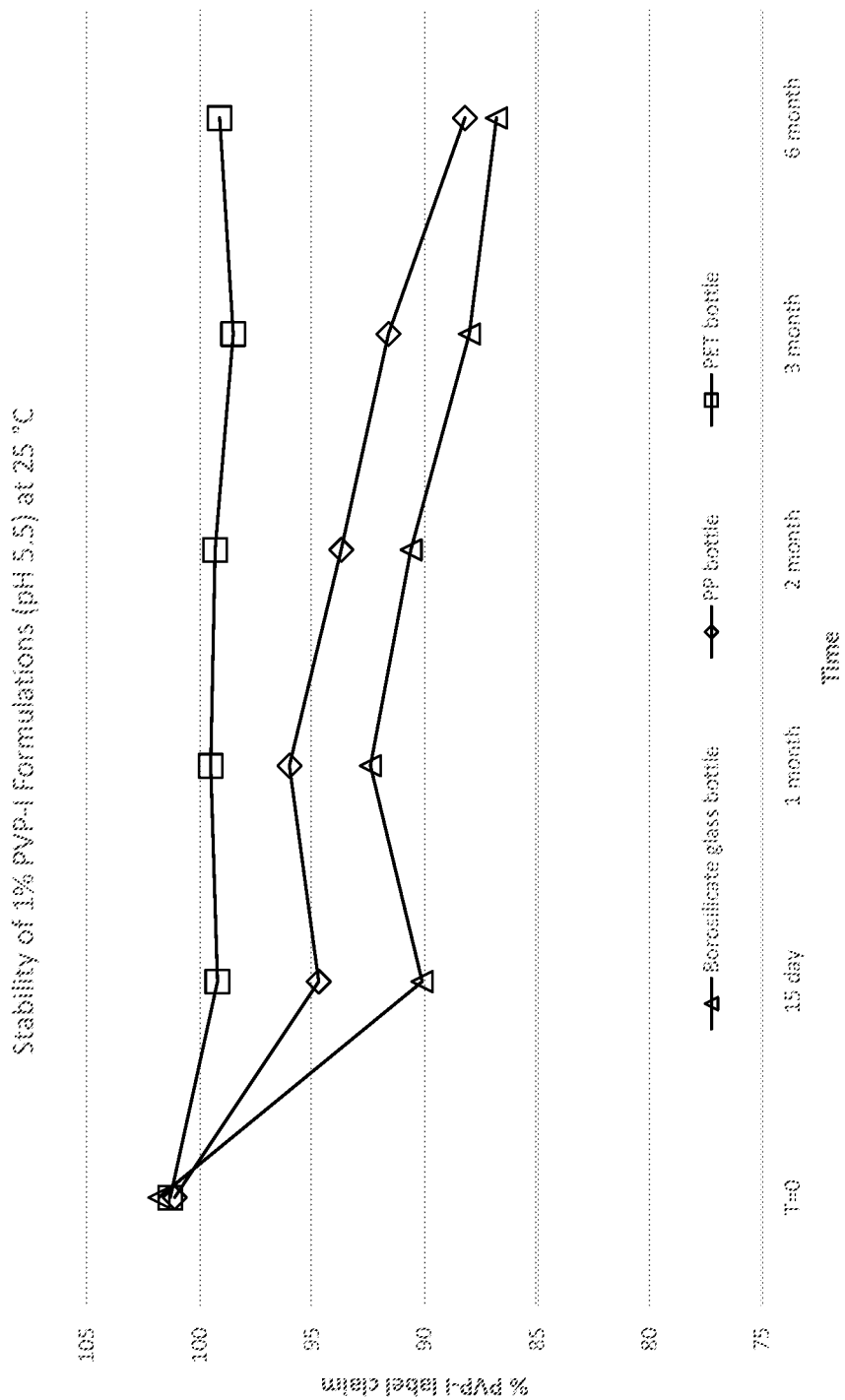
FIG. 2 shows the stability data of 1.0% PVP-I formulation (pH 5.5) at 25° C. in borosilicate glass, PP, and PET bottles.

FIGS. 1 and 2 show the data from the stability tests of these dilute aqueous formulations of 0.6% PVP-I (pH 5.5) at 25° C. in Borosilicate amber glass, PP, and PET bottles, and of the dilute aqueous formulations of 1.0% PVP-I (pH 5.5) at 25° C. in Borosilicate amber glass, PP, and PET bottles.

Figure 3:
FIG. 3 shows the stability data of 0.6% PVP-I formulation (pH 5.5) at 5° C. in borosilicate glass, PP, and PET bottles.
Figure 4:
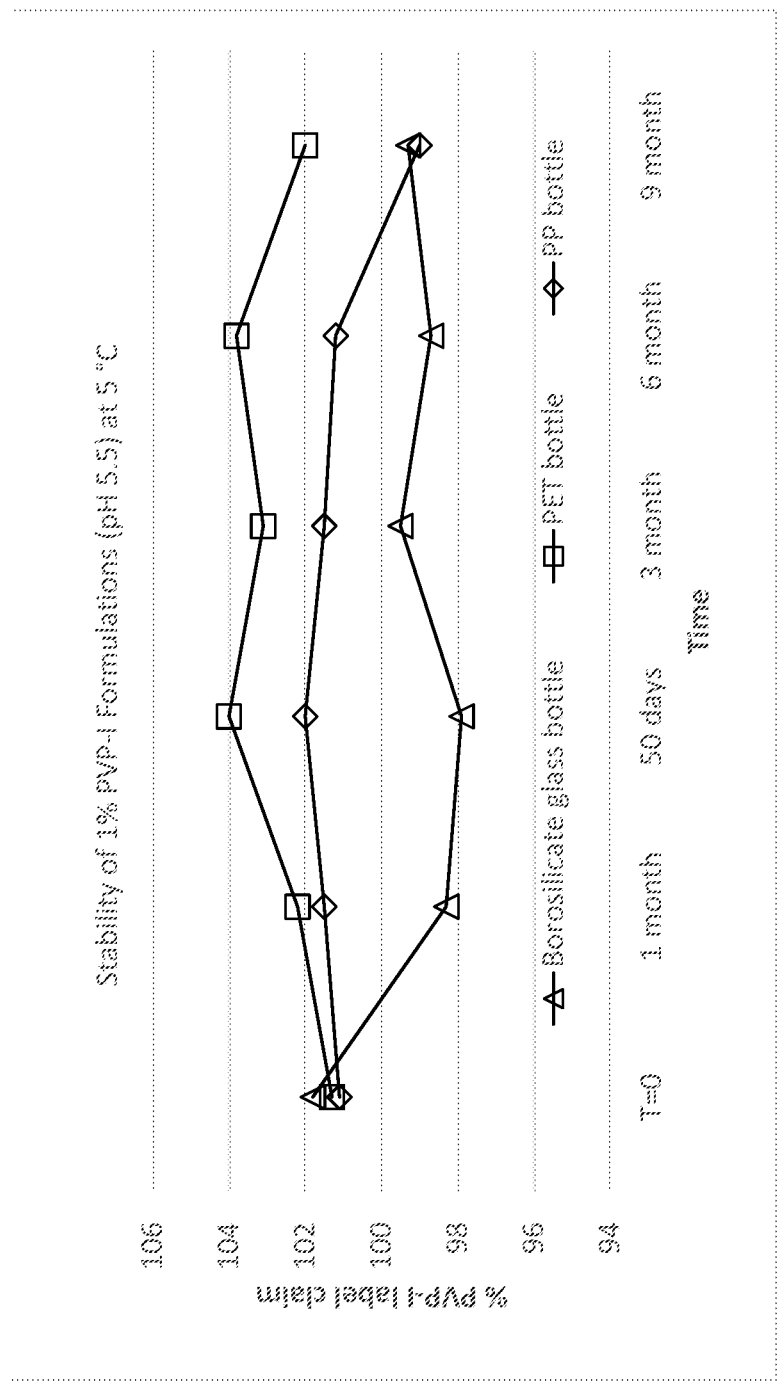
FIG. 4 shows the stability data of 1.0% PVP-I formulation (pH 5.5) at 5° C. in borosilicate glass, PP, and PET bottles.

Similar stability study was conducted at 5° C. The results are shown in Tables 5 and 6 and FIGS. 3 and 4.

TABLE 5

Stability data of 0.6% PVP-I formulations (pH 5.5) at 5° C.

| Container | T0 | 1 month | 50 days | 3 months | 6 months | 9 months |
|---|---|---|---|---|---|---|
| Borosilicate amber glass bottle | 102.7 | 90.6 | 87.7 | 86 | 87.3 | 84.0 |
| PET bottle | 100.9 | 99.6 | 100 | 101.4 | 101 | 98.9 |
| PP bottle | 100.8 | 96.3 | 97.2 | 98.6 | 97.5 | 93.4 |

TABLE 6

Stability data of 1.0% PVP-I formulations (pH 5.5) at 5° C.

| Container | T0 | 1 month | 50 days | 3 months | 6 months | 9 months |
|---|---|---|---|---|---|---|
| Borosilicate amber glass bottle | 101.8 | 98.3 | 97.9 | 99.5 | 98.7 | 99.3 |
| PET bottle | 101.3 | 102.2 | 104 | 103.1 | 103.8 | 102.0 |
| PP bottle | 101.1 | 101.5 | 102 | 101.5 | 101.2 | 99.0 |

As shown in Tables 3-6 and FIGS. 1-4, both 0.6% and 1.0% aqueous PVP-I formulations (at pH 5.5) in PET bottles had significantly better stability than those in PP bottles and in amber glass bottles. For 0.6% PVP-I Formulation, PP bottles provide significantly better stability that amber glass bottle. The available iodine was still 92.8% after 6 months at 25° C. for solutions in PET bottles while the available iodine was 76.6% for solutions in PP bottles and 61.0% for solutions in amber glass bottles. For 1.0% formulation, PP bottles provide slightly better stability for the PVP-I solutions than amber glass bottle. The available iodine was 99.1% after 6 months at 25° C. for solutions in PET bottles while the available iodine was 88.2% for solutions in PP bottles and 86.8% for solutions in amber glass bottles. All the dilute PVP-I formulations prepared and studied in this Example had the pH value of 5.5. This is surprisingly contradictory to what were descried in prior arts that plastic bottles, particularly PET bottles and PP bottles, provided better stability for dilute PVP-I solutions than amber glass bottles. Another surprising and unexpected discovery is that the dilute PVP-I solutions or formulations at pH 5.5 exhibited very different stability trends in different packaging containers, as comparing to the same solutions with pH of 4.0 or 4.5.

Example 3

A 30-day stress study at 40° C. was conducted with the 0.6% aqueous PVP-I formulations, packaged in borosilicate amber glass bottle, PET bottle, and PP bottle. "Stress study" in here, as per FDA guidance "Q1A(R2) Stability Testing of New Drug Substances and Products", means the storage temperature is above the temperature for accelerated testing temperature (which is 25° C. herein). The stability results are shown in Table 7 and FIG. 5.

TABLE 7

30-day stress study at 40° C. for 0.6% PVP-I formulation (pH 5.5)

| Container | 0 day | 5 days | 10 days | 15 days | 30 days |
|---|---|---|---|---|---|
| Borosilicate glass bottle | 102.7 | 75.7 | 67.6 | 63.3 | 55.8 |
| PET bottle | 100.9 | 92.0 | 94.5 | 91.2 | 88.8 |
| PP bottle | 100.8 | 80.4 | 80.9 | 73.9 | 63.5 |

Figure 5:
FIG. 5 shows the stress study results of 0.6% PVP-I formulation (pH 5.5) at 40° C. in borosilicate glass, PP, and PET bottles.

The results listed in Table 7 and shown in FIG. 5 demonstrate that for the 0.6% aqueous PVP-I formulations of pH 5.5, PET bottles also provided the best stability, significantly better than PP bottles and glass bottles with unexpected stability of available iodine content over 85% after 30 days at 40° C., and PP bottles provide better stability than amber glass bottles.

Example 4

A heat cycle study was conducted for the 0.6% PVP-I formulation of pH 5.5 and the stability assay result is shown in Table 8. For the heat cycle study in this example, the samples were firstly placed in a −20~-10° C. environment for two days and then placed in a 40° C. environment for two days as one cycle. The heat cycle study was performed for 3 cycles with a total of 12 days.

TABLE 8

Heat cycle study result for 0.6% PVP-I formulation (pH 5.5)

| | Borosilicate amber glass bottle | | PET bottle | | PP bottle | |
|---|---|---|---|---|---|---|
| | 0 day | 12-day cycle | 0 day | 12-day cycle | 0 day | 12-day cycle |
| Available Iodine % | 102.7 | 69.8 | 100.9 | 91.6 | 100.8 | 79.9 |

It can be seen that PET bottles provide the best stability in the heat cycle study, with over 90% available iodine content after the 5-day heat cycle, and PET bottles provided significantly better stability of dilute PVP-I solutions than PP bottles and glass bottles. PP bottles provide significant better stability than glass bottles for 0.6% PVP-I formulation (pH 5.5).

Example 5

1.0% aqueous PVP-I formulations of pH 4.0, pH 4.5 and pH 5.6 were prepared with the compositions listed in Table 9.

TABLE 9

1.0% PVP-I Formulations with different pH values

| Ingredient | 1.0% PVP-I, pH 4.0 | 1.0% PVP-I, pH 4.5 | 1.0% PVP-I, pH 5.6 |
|---|---|---|---|
| PVP-I | 1.05 | 1.05 | 1.05 |
| Gellan gum | 0.25 | 0.25 | 0.25 |
| Sodium Chloride | 0.20 | 0.20 | 0.20 |
| Mannitol | 3.3 | 3.3 | 3.3 |
| Tromethamine | as needed | as needed | as needed |
| Distilled water | Q.S. | Q.S. | Q.S. |
| pH | 4.0 | 4.5 | 5.6 |

The 1.0% PVP-I formulations were filled in amber glass bottles, PET bottles 1, PET bottles 2, HDPE bottles and PP bottles and their stability was evaluated at 25° C. and 60% relative humidity. Tables 10-12 list the PVP-I stability test results after storing at different time points at 25° C. The available iodine content was determined by titration with sodium thiosulfate.

Figure 6:
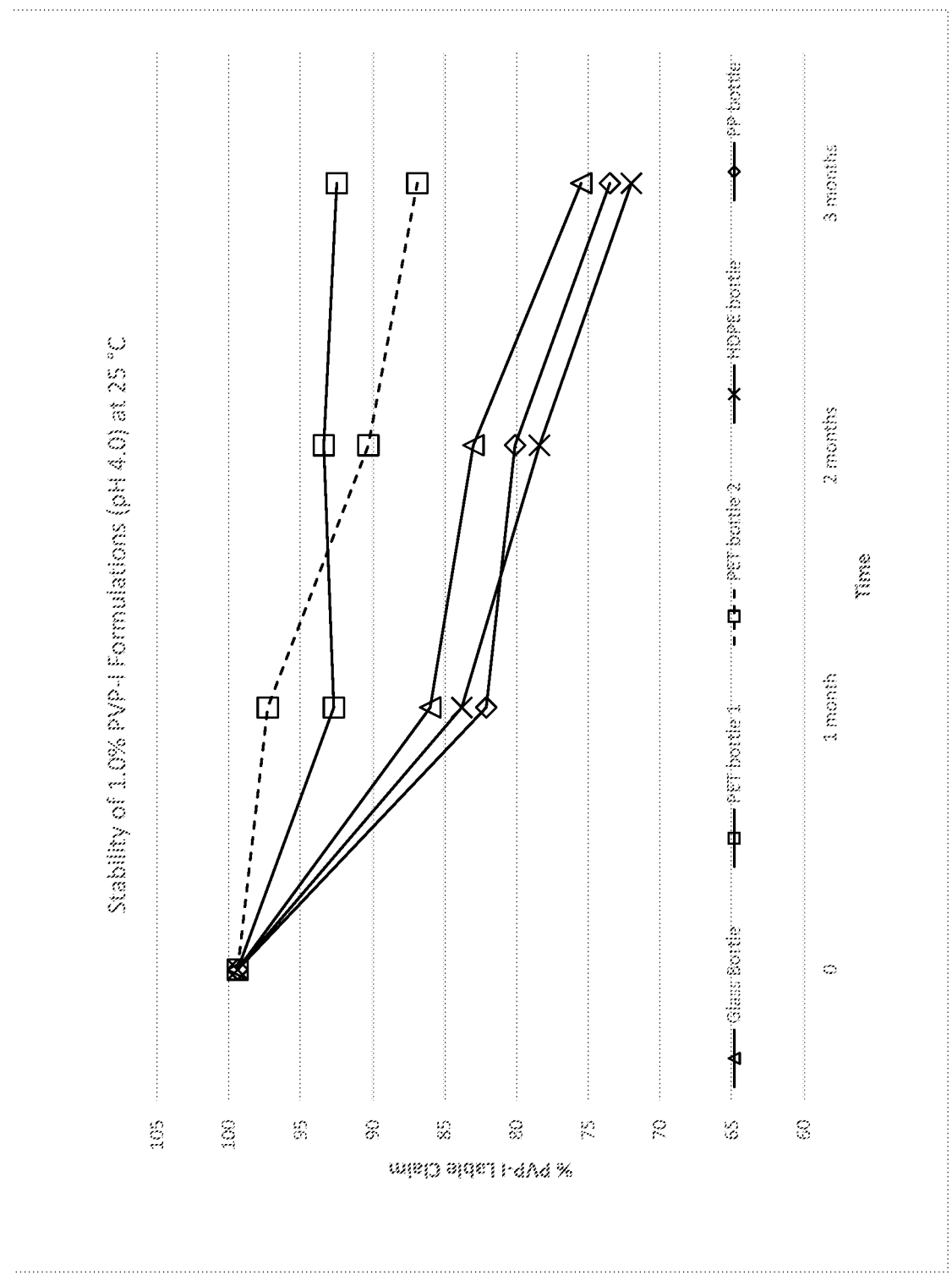
FIG. 6 shows the stability data of 1.0% PVP-I formulation (pH 4.0) at 25° C. in borosilicate glass, PET, HDPE and PP bottles.
Figure 7:
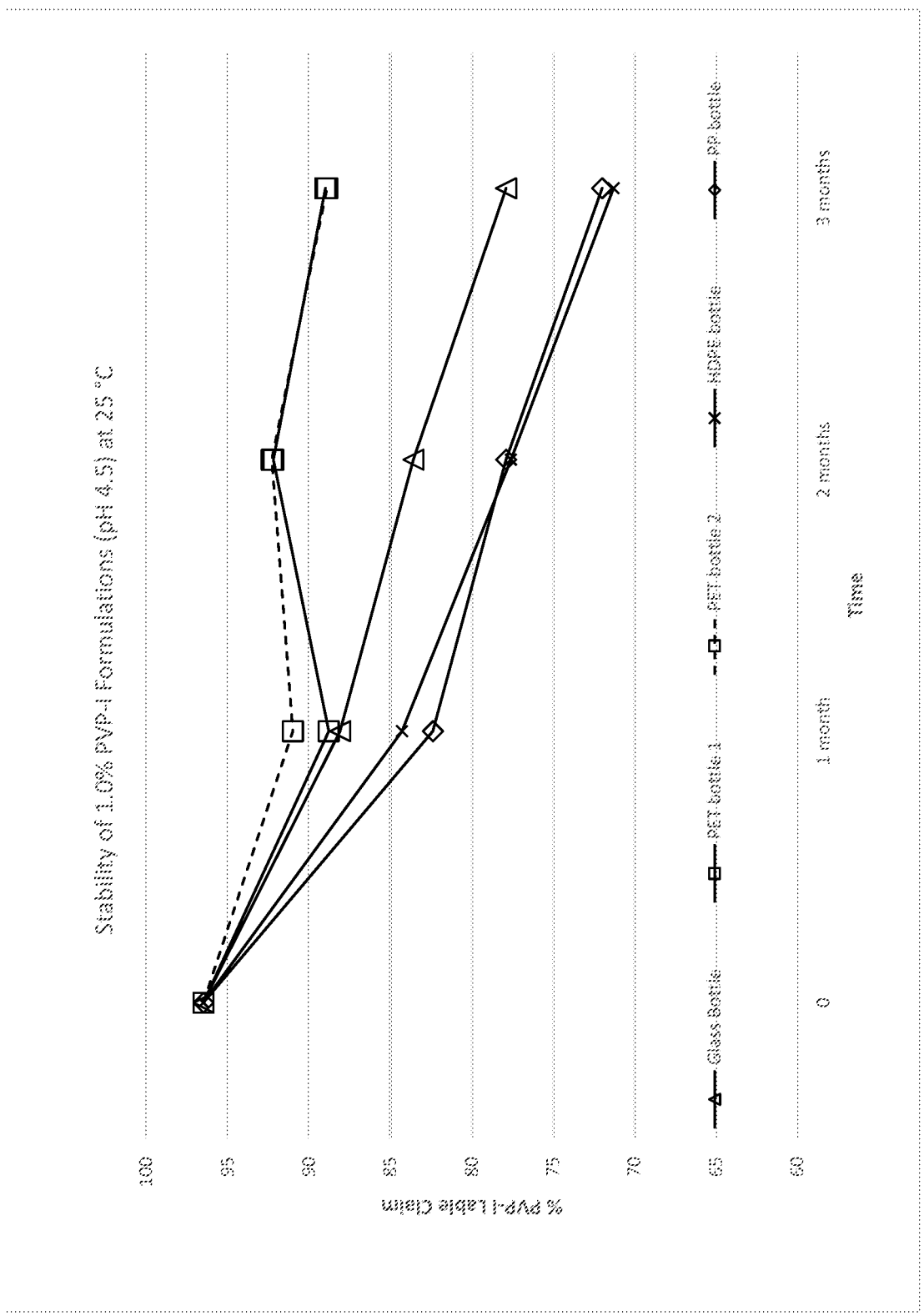
FIG. 7 shows the stability data of 1.0% PVP-I formulation (pH 4.5) at 25° C. in borosilicate glass, PET, HDPE and PP bottles.
Figure 8:
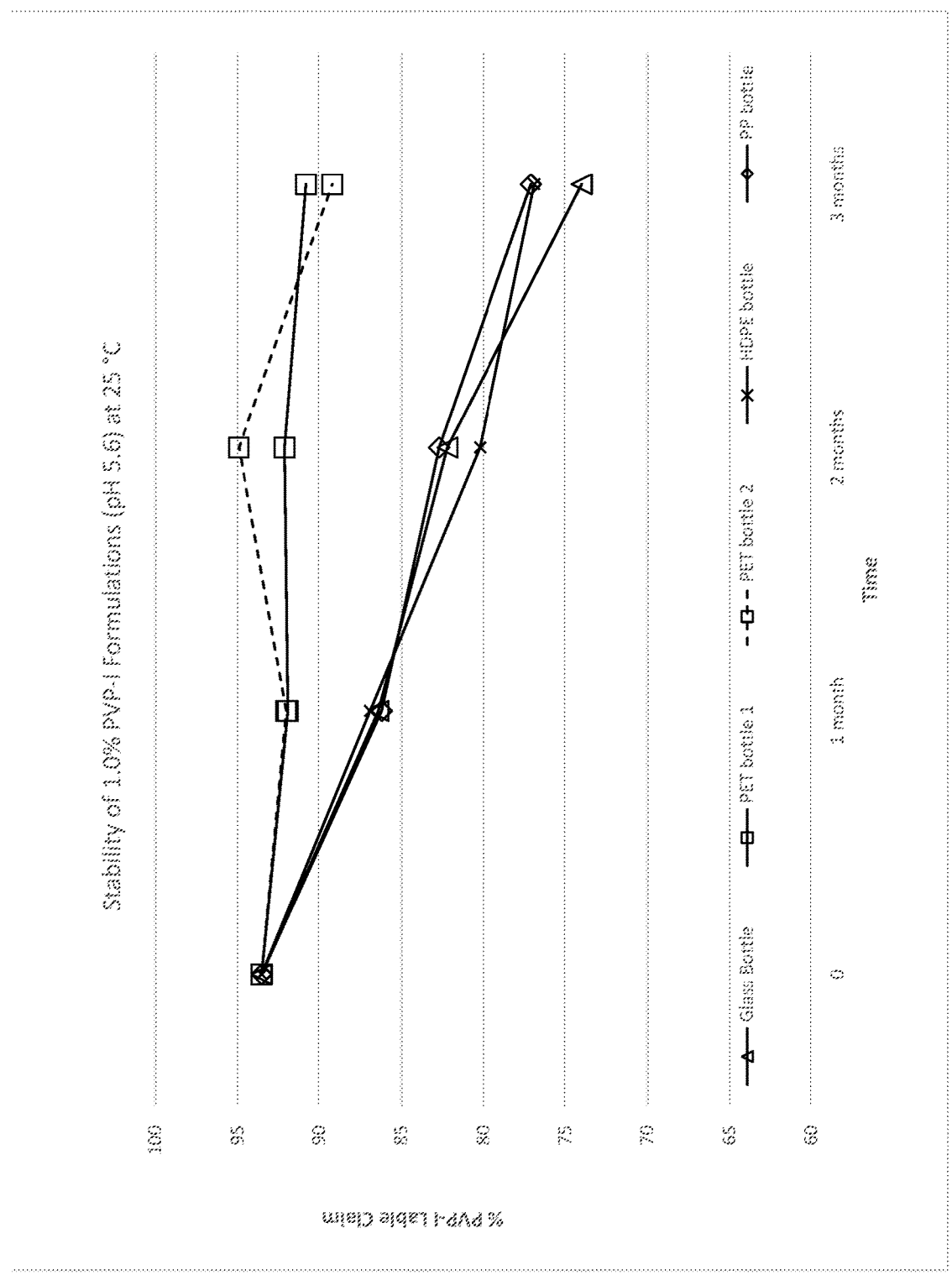
FIG. 8 shows the stability data of 1.0% PVP-I formulation (pH 5.6) at 25° C. in borosilicate glass, PET, HDPE and PP bottles.

Table 10-12 and FIGS. 6-8 show the data obtained from the stability of these 1.0% aqueous PVP-I formulations.

TABLE 10

Stability data of 1.0% PVP-I, pH 4.0 formulations at 25° C.

| Packaging | T = 0 | 1 month | 2 months | 3 months |
|---|---|---|---|---|
| Borosilicate amber glass bottle | 99.4 | 86.0 | 83.0 | 75.5 |
| PET bottle 1 | | 92.7 | 93.4 | 92.5 |
| PET bottle 2 | | 97.3 | 90.3 | 86.9 |
| HDPE bottle | | 83.8 | 78.4 | 72.0 |
| PP bottle | | 82.1 | 80.1 | 73.5 |

Specifically, Table 10 and FIG. 6 show the surprising stability of the 1.0% PVP-I formulations (pH 4.0) over three months at 25° C. in Borosilicate amber glass, PET, HDPE and PP bottles. PE bottles show surprisingly stabling effect on the PVP-I formulations, with 89.55% of available iodine on average remaining in the 1.0% PVP-I formulations after 3 months, much higher than amber glass, HDPE, or PP bottles.

TABLE 11

Stability data of 1.0% PVP-I, pH 4.5 formulations at 25° C.

| Packaging | T = 0 | 1 month | 2 months | 3 months |
|---|---|---|---|---|
| Borosilicate amber glass bottle | 96.5 | 88.1 | 83.6 | 77.9 |
| PET bottle 1 | | 88.8 | 92.2 | 89.0 |
| PET bottle 2 | | 91.0 | 92.3 | 88.9 |
| HDPE bottle | | 84.3 | 77.6 | 71.3 |
| PP bottle | | 82.4 | 77.9 | 72.0 |

Table 11 and FIG. 7 show the similarly surprising stabilizing effect of PET bottles on the 1.0% PVP-I formulations (pH 4.5) at 25° C., which kept at least 89% of available iodine on average remaining in the 1.0% PVP-I formulations after 3 months, also much higher than amber glass, HDPE or PP bottles.

TABLE 12

Stability data of 1.0% PVP-I, pH 5.6 formulations at 25° C.

| Packaging | T = 0 | 1 month | 2 months | 3 months |
|---|---|---|---|---|
| Borosilicate amber glass bottle | 93.5 | 86.4 | 82.2 | 74.0 |
| PET bottle 1 | | 91.9 | 92.1 | 90.8 |
| PET bottle 2 | | 92.0 | 94.9 | 89.2 |
| HDPE bottle | | 86.9 | 80.2 | 76.9 |
| PP bottle | | 86.2 | 82.7 | 77.1 |

Lastly, Table 12 and FIG. 8 also show the similarly surprising effect of PET bottles on stabilizing the 1.0% PVP-I formulations (pH 5.6) at 25° C., which kept at least 90% of available iodine on average remaining in the 1.0% PVP-I formulations after 3 months, also much higher than amber glass, HDPE or PP bottles.

In summary, the stability of dilute PVP-I solutions in containers of different materials varied depending on the solutions' pH values. Yet, it was surprisingly discovered that for formulations at all pH values, PET bottles provided the best stability compared to amber glass bottles, HDPE bottles, and PP bottles, particularly the amber glass bottles which have been widely used for over a century. For 1.0% aqueous PVP-I formulations of pH 4.0 and pH 4.5, glass bottles provided better stability than HDPE bottles and PP bottles. While for pH 5.6 formulations, HDPE bottles and PP bottles provided slightly better stability than glass bottles up to 3 months. The two PET bottles from two different sources did not result in significant difference.

Example 6

Additional aqueous 1.0% PVP-I formulations at different pH (pH 4.5, pH 5.0 and pH 5.6) were prepared to have the formulae listed in Table 13.

TABLE 13

1.0% PVP-I Formulations of different pH

| Ingredient | 1.0% PVP-I, pH 4.5 | 1.0% PVP-I, pH 5.0 | 1.0% PVP-I, pH 5.6 |
|---|---|---|---|
| PVP-I | 1.05 | 1.05 | 1.05 |
| Gellan gum | 0.25 | 0.25 | 0.25 |
| Sodium Chloride | 0.20 | 0.20 | 0.20 |
| Mannitol | 3.3 | 3.3 | 3.3 |
| Tromethamine | As needed | As needed | As needed |
| Distilled water | Q.S. | Q.S. | Q.S. |
| pH | 4.5 | 5.0 | 5.6 |

Figure 9:
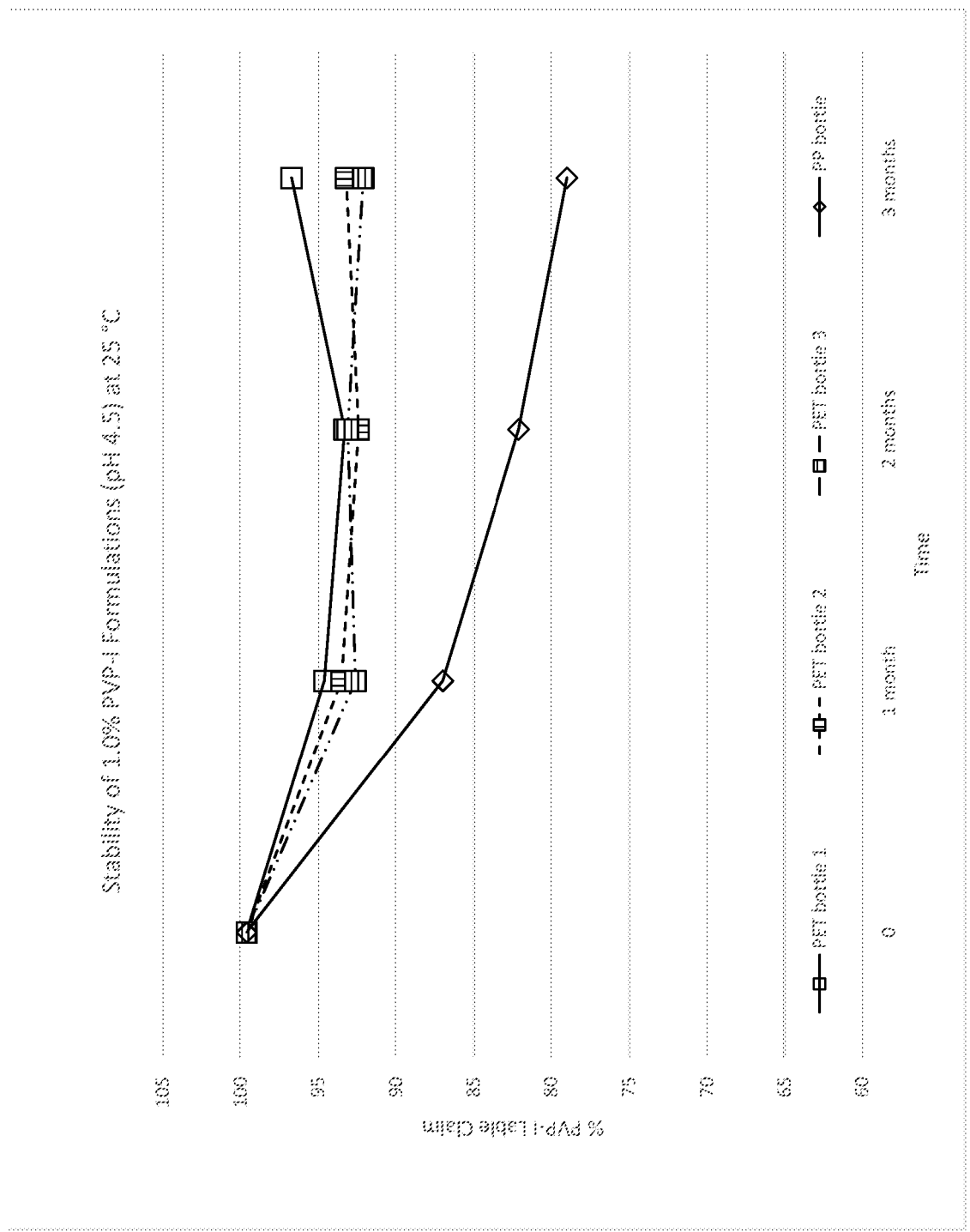
FIG. 9 shows the stability data of 1.0% PVP-I formulations (pH 4.5) at 25° C. in PET and PP bottles.
Figure 10:
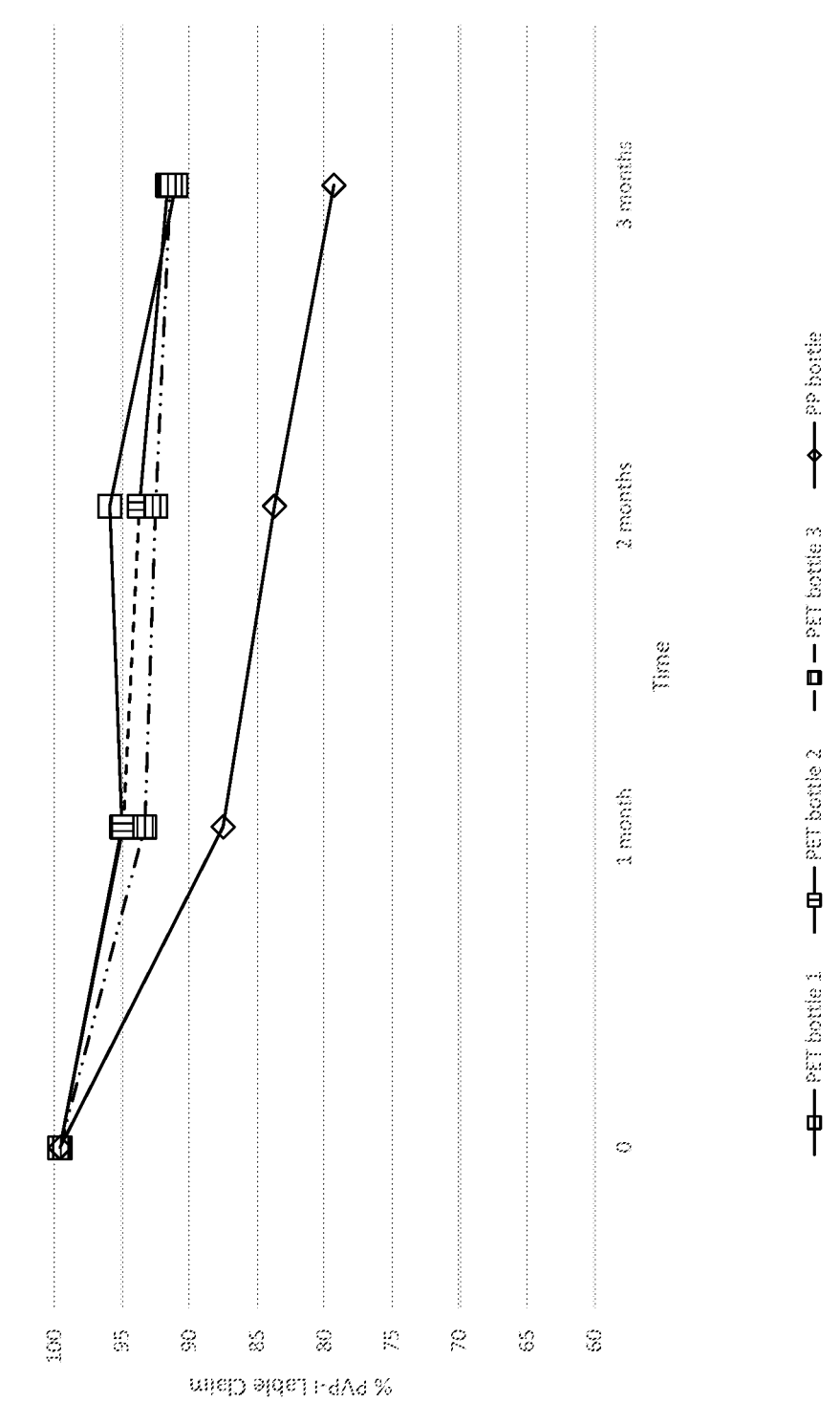
FIG. 10 shows the stability data of 1.0% PVP-I formulation (pH 5.0) at 25° C. in PET and PP bottles.
Figure 11:
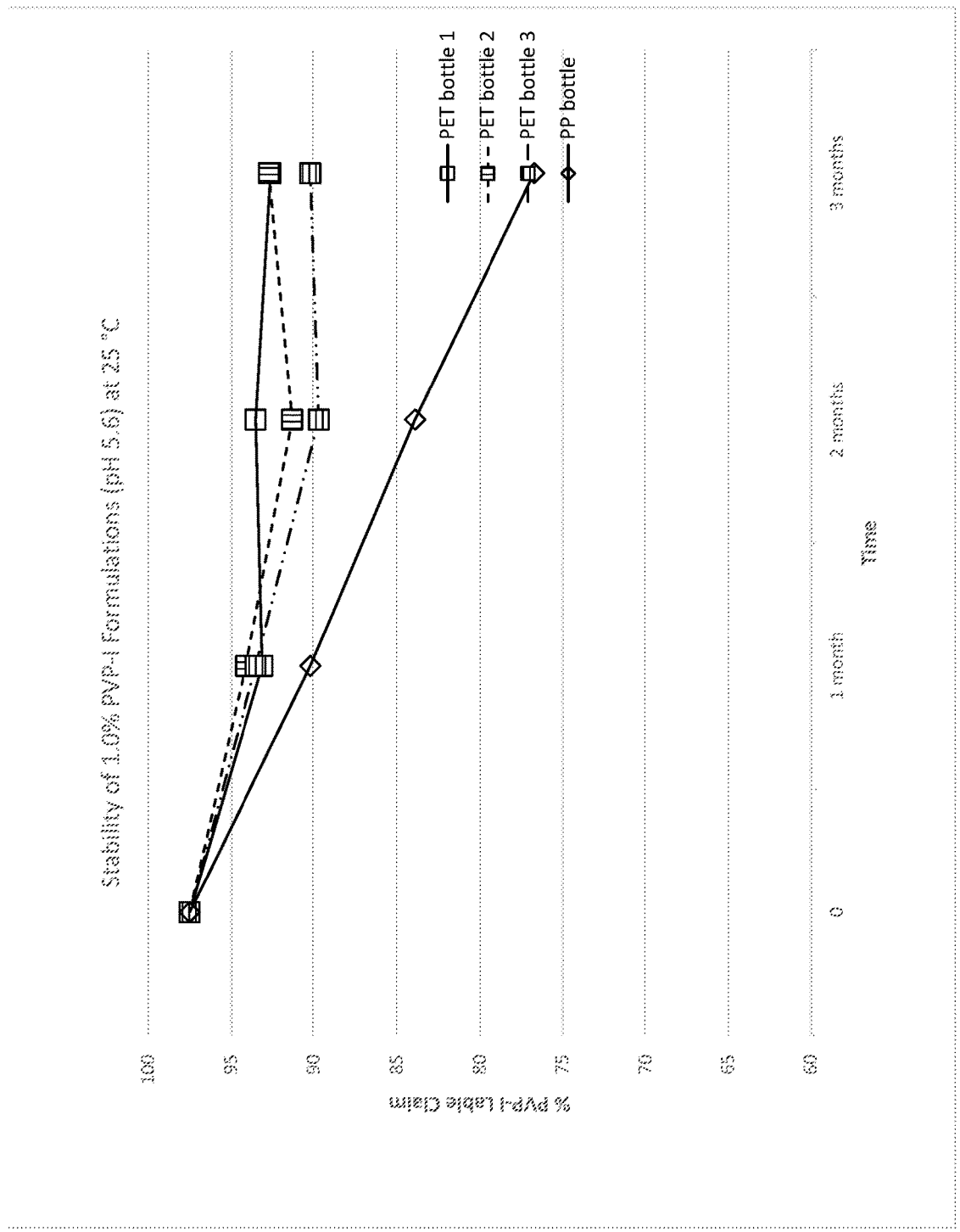
FIG. 11 shows the stability data of 1.0% PVP-I formulation (pH 5.6) at 25° C. in PET and PP bottles.

The stability of these PVP-I formulations was evaluated at 25° C. with 60% relative humidity (RH) by determining the concentrations of available PVP-I by sodium thiosulfate titration, after the formulations were filled in PET bottles, PET bottles and PP bottles. Tables 14-16 and FIGS. 9-11 show the results from the stability tests after the formulations were stored at different time points at 25° C.

TABLE 14

Stability data of 1.0% PVP-I, pH 4.5 formulations at 25° C. and 60% RH

| Packaging | T = 0 | 1 month | 2 months | 3 months |
|---|---|---|---|---|
| PET bottle 1 | 99.6 | 94.6 | 93.3 | 96.7 |
| PET bottle 2 | | 93.5 | 92.4 | 93.2 |
| PET bottle 3 | | 92.6 | 93.1 | 92.1 |
| PP bottle | | 87.0 | 82.1 | 79.0 |

Table 14 and FIG. 9 show that the 1.0% PVP-I formulations (pH 4.5) were surprisingly much more stable in PET bottles over a three-month period when they were stored at 25° C. and 60% relative humidity (RH), with 95% (on average) of the PVP-I still available after three months in PET bottles, compared to under 80% in PP bottles.

TABLE 15

Stability result of 1.0% PVP-I, pH 5.0 formulation at 25° C. and 60% RH

| Packaging | T = 0 | 1 month | 2 months | 3 months |
|---|---|---|---|---|
| PET bottle 1 | 99.6 | 95.0 | 95.9 | 91.0 |
| PET bottle 2 | | 94.9 | 93.7 | 91.6 |
| PET bottle 3 | | 93.3 | 92.5 | 91.4 |
| PP bottle | | 87.5 | 83.7 | 79.3 |

Similarly, Table 15 and FIG. 10 show that the 1.0% PVP-I formulations (pH 5.0) were surprisingly much more stable in PET bottles over a three-month period when they were stored at 25° C. and 60% relative humidity (RH), with at least 91% of the PVP-I still available after three months in PET bottles, compared to under 80% in PP bottles.

TABLE 16

Stability data of 1.0% PVP-I, pH 5.6 formulations at 25° C. and 60% RH

| Packaging | T = 0 | 1 month | 2 months | 3 months |
|---|---|---|---|---|
| PET bottle 1 | 97.5 | 93.1 | 93.5 | 92.6 |
| PET bottle 2 | | 94.1 | 91.3 | 92.7 |
| PET bottle 3 | | 93.5 | 89.7 | 90.2 |
| PP bottle | | 90.2 | 83.9 | 76.7 |

Lastly, Table 16 and FIG. 11 also show that the 1.0% PVP-I formulations (pH 5.6) were surprisingly much more stable in PET bottles over a three-month period when they were stored at 25° C. and 60% relative humidity (RH), with at least 91% (on average) of the PVP-I still available after three months in PET bottles, compared to well under 80% in PP bottles.

It was surprisingly discovered that for 1.0% aqueous PVP-I formulations of various pH values, PET bottles provided the best stability and was significantly better than PP bottles. For the three PET bottles from different sources, there is no significant difference.

In summary, dilute PVP-I formulations in PET bottles provide the best stability than those in amber glass bottles, HDPE bottles and PP bottles. Amber glass bottles provided better stability for dilute PVP-I solutions than HDPE bottles and PP bottles at lower pH (pH 4.0 and pH 4.5) did. PP bottles and HDPE bottles provided better stability for dilute PVP-I solutions than amber glass bottle at higher pH (e.g., pH 5.5), especially for lower PVP-I concentration (e.g. 0.6%).

What is claimed is:

1. A pharmaceutical article comprising a container and an aqueous povidone iodine (PVP-1) formulation contained in the container,
   wherein the container comprises a bottle made of polyethylene terephthalate (PET) or polypropylene (PP);
   wherein the aqueous PVP-1 formulation contains PVP-1 at a concentration in the range of 0.6-1.5% (w/w or w/v), sodium chloride, mannitol, and gellan gum;
   wherein at least 90% of original available iodine content in the PVP-1 formulation remains in the formulation after one month at room temperature;
   wherein the PVP-1 formulation is free from a stabilizing agent selected from the group consisting of potassium iodate, potassium iodine, and iodide added for stabilizing PVP-1; and
   wherein the PVP-1 formulation has a pH value in the range of pH 4.0 to pH 6.0, at which the PVP-1 formulation is more stable in the bottle made of polyethylene terephthalate (PET) or polypropylene (PP), with a higher amount of original available iodine content remained after one month at room temperature, than in a bottle of amber glass.

2. The pharmaceutical article of claim 1, wherein the PVP-I formulation has a pH value in the range of pH 4.0 to pH 5.5.

3. The pharmaceutical article of claim 1, wherein the aqueous PVP-I formulation is in the form of a solution, suspension, paste, emulsion, cream, or gel.

4. The pharmaceutical article of claim 1, wherein the PVP-I concentration is in the range of 0.6-1.0% (w/w or w/v).

5. The pharmaceutical article of claim 1, wherein the PVP-I concentration is about 0.6%, or 1.0% (w/w or w/v).

6. The pharmaceutical article of claim 1, wherein the PVP-I formulation is either buffered or non-buffered.

7. The pharmaceutical article of claim 1, wherein the container further comprises at least one of a tip, a dropper, and a cap.

8. The pharmaceutical article of claim 7, wherein the tip or dropper is made of HDPE; or the cap is made of PP or HDPE.

9. The pharmaceutical article of claim 1, wherein PVP-I exists only in unencapsulated form in the PVP-I formulation.

10. A method of improving storage stability of an aqueous povidone iodine (PVP-I) formulation, free from potassium iodate, potassium iodine, and iodide for stabilizing PVP-I, comprising:
    (a) forming the aqueous PVP-formulation with PVP-I at a concentration in the range of 0.6-1.5% (w/w or w/v), sodium chloride, mannitol, and gellan gum, wherein the PVP-I formulation has a pH value in the range of pH 4.0 to pH 6.0 and is free from potassium iodate, potassium iodine, and iodide added for stabilizing PVP-I;
    (b) placing the PVP-I formulation in a bottle made of polyethylene terephthalate (PET), or polypropylene (PP); and sealing the bottle;
    wherein at least 90% of original available iodine content in the PVP-I formulation remains in the formulation after one month at room temperature; and which the PVP-I formulation is more stable in the bottle made of polyethylene terephthalate (PET)-or polypropylene (PP), with a higher amount of original available iodine content remained after one month at room temperature, than in a bottle of amber glass.

* * * * *